Figure 1:
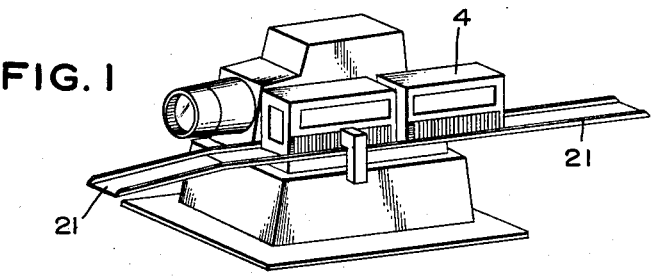

RE 25 327

Dec. 23, 1958      W. C. ANDERTON      2,865,121

MULTIPLE SLIDE CHANGER FOR AUTOMATIC SLIDE PROJECTOR

Filed Nov. 12, 1957

*INVENTOR*

WALTER CARLOS ANDERTON

BY

*ATTORNEY*

United States Patent Office 2,865,121
Patented Dec. 23, 1958

2,865,121

MULTIPLE SLIDE CHANGER FOR AUTOMATIC SLIDE PROJECTOR

Walter Carlos Anderton, Birmingham, Ala.

Application November 12, 1957, Serial No. 695,916

2 Claims. (Cl. 40—79)

This invention relates to a multiple slide changer for automatic slide projector. It has for its main objects to provide such a device that will be highly satisfactory for the purpose intended, simple in structure, comparatively cheap to manufacture, easy to use and keep in working condition, and very durable.

A further object is to overcome the objection of having to place one slide container at a time in a projector to show the plurality of pictures in the container, by providing simple means for carrying through a plurality of containers removably attached together for the purpose.

Other objects and advantages will appear from the drawing and description.

Figure 2:
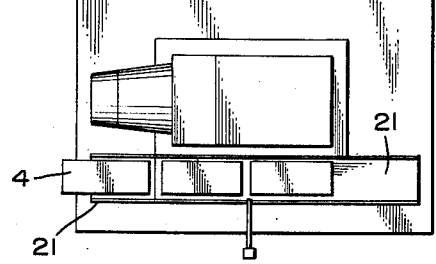
Figure 3:
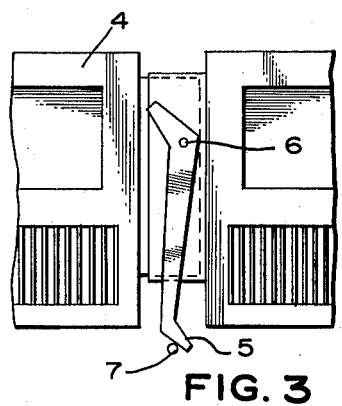
Figure 5:
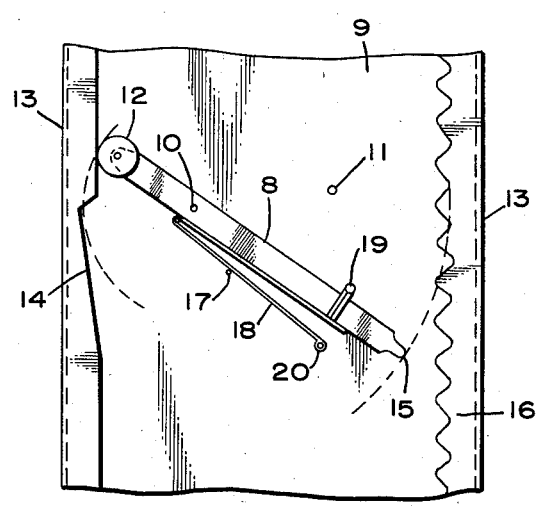
Figure 4:
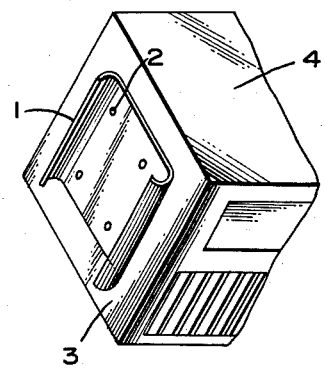

By referring generally to the drawing it will be observed that Fig. 1 is a perspective view of an automatic picture slide projector with two slide containers mounted on same in accordance with the present invention; Fig. 2 is a top plan view of parts shown in Fig. 1; Fig. 3 is a detail view showing the ends of two slide containers removably attached together with releasing lever between in position for use; Fig. 4 is an enlarged perspective view of an end of a slide container with a holding clip according to this invention thereon; and Fig. 5 is an enlarged detail view showing the bar for use at the joint between slide container ends, and part of a bottom of a container.

Similar reference numerals refer to similar parts throughout the several views.

The projector shown and its electrically operated mechanism are not claimed as any part of the present invention which is limited to the means of connecting and controlling a plurality of picture slide containers along on the projector rather than placing one container at a time on the projector to show the pictures in same.

Referring to the drawing in detail it will be seen that the device comprises a curved end clip 1 attached by rivets 2 on the end face 3 of a regular picture slide container 4. Such a clip is attached on each end of each container as shown in Fig. 3 and are removably held together by one clip fitting into the other as a result of being made of thin plate steel. A lever 5 is attached on a small stud 6 mounted on one end of each container. A stud 7 is mounted on the base portion of the projector to make contact with the lever outer end to separate the clip joint. A bar 8 is mounted on the base face 9 of the projector. The bar is swingable on a stud 10 attached in the base. A second stud 11 in the base acts as a stop of the bar. A roller 12 is mounted on a shaft in one end of the bar and is adapted to roll along on a raised edge 13 of the container. The edge is provided with a recess 14 for the roller to enter to cause the pointed end 15 of the bar to move out of the rack of gear teeth 16, which are part of the regular mechanism, to advance the slide container when mounted on the projector. A third stud 17 is attached in the fact of the projector as a stop for a spring 18 attached by stud 20 to the base. The bar is provided with a spring type hinge 19 set in tension to return the bar to its straight position after it jumps its pointed end from the last gear tooth of the used slide container to the first tooth of the attached container. An extension 21 is mounted on the projector to accommodate additional slides containers.

From the foregoing it will appear that the parts of the present invention are adapted for attachment to a regular picture projector and its slide containers for the purpose of using a plurality of containers by attaching same together rather than placing each container separately for use.

The various parts may be made of any material suitable for the purpose, but I prefer to use good grades of metal. Also the parts may be made in different sizes and capacities.

While I have shown and described the preferred embodiment of my invention, I do not wish to limit same to the exact and precise details of structure, and reserve the right to make all modifications and changes so long as they remain within the scope of the invention and the following claims.

Having described my invention, I claim:

1. A multiple slide changer for automatic slide projectors comprising, containers for picture slides, a spring type clip attached on each end of the container, said clips being adapted to fit removably together and hold two containers together for use on a picture projector, a base portion for supporting said containers, a lever mounted on one end of each container, a stud mounted on said base portion adjacent an end of said lever, said lever being adapted to separate a clip joint when the free end of the lever makes contact with the said adjacent stud; a bar, said bar being mounted swingably on the bottom upper face of a projector, said bar being provided with a roller in one end and a spring type hinge joint in its other end portion, a spring attached near said bar, three studs mounted in the face of the base as stops for said bar; an edge of the container having part removed to form a recess for said roller, the opposite edge of the container being formed as a rack of gear teeth, one end of the said bar being pointed and adapted to fit in said gear teeth, said bar being adapted to move its pointed end from the last gear tooth in one slide container to the first gear tooth in another slide container when the containers are held together by said clip joint and moved along by the mechanism of the projector.

2. Parts for use in combination with a regular picture projector and containers for slides with pictures therein, said parts comprising, containers for picture slides, a spring type clip attached on each end of the container, said clips being adapted to fit removably together and hold two containers together for use on a picture projector, a lever mounted on one end of each container, a base portion for supporting said containers, a stud mounted on said base portion adjacent an end of said lever, said lever being adapted to separate a clip joint when the free end of the lever makes contact with the said adjacent stud; a bar, said bar being mounted swingably on the bottom upper face of a projector, said bar being provided with a roller in one end and a spring type hinge joint in its other end portion, a spring attached near said bar, three studs mounted in the face of the base as stops for said bar; an edge of the container having part removed to form a recess for said roller, the opposite edge of the container being formed as a rack of gear teeth, one end of the said bar being pointed and adapted to fit in said gear teeth, said bar being adapted to move its pointed end from the last gear tooth in one slide container to the first gear tooth in another slide container when the containers are held together by said clip joint and moved along by the mechanism of the projector.

No references cited.